Figure 1:
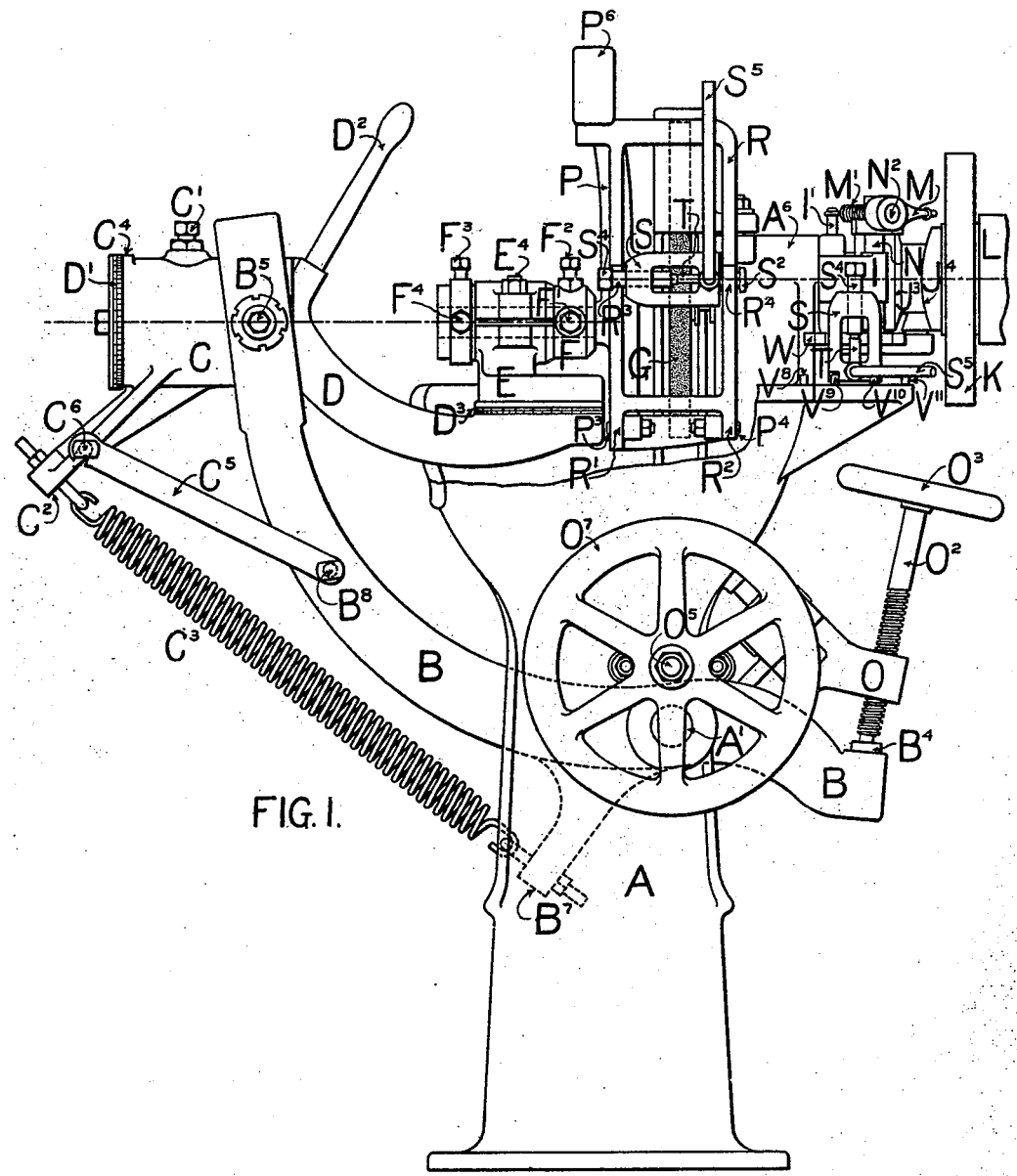

No. 646,397. Patented Mar. 27, 1900.
J. S. BANCROFT & W. H. THORNE.
GRINDING MACHINE.
(Application filed Oct. 23, 1898.)

(No Model.) 6 Sheets—Sheet 1.

WITNESSES: John L. Phillips, E. R. Harper

INVENTORS: J. Sellers Bancroft, Wm. H. Thorne.

No. 646,397. Patented Mar. 27, 1900.
J. S. BANCROFT & W. H. THORNE.
GRINDING MACHINE.
(Application filed Oct. 23, 1896.)
(No Model.) 6 Sheets—Sheet 2.

WITNESSES: INVENTORS

No. 646,397. Patented Mar. 27, 1900.
J. S. BANCROFT & W. H. THORNE.
GRINDING MACHINE.
(Application filed Oct. 23, 1896.)
(No Model.) 6 Sheets—Sheet 4.

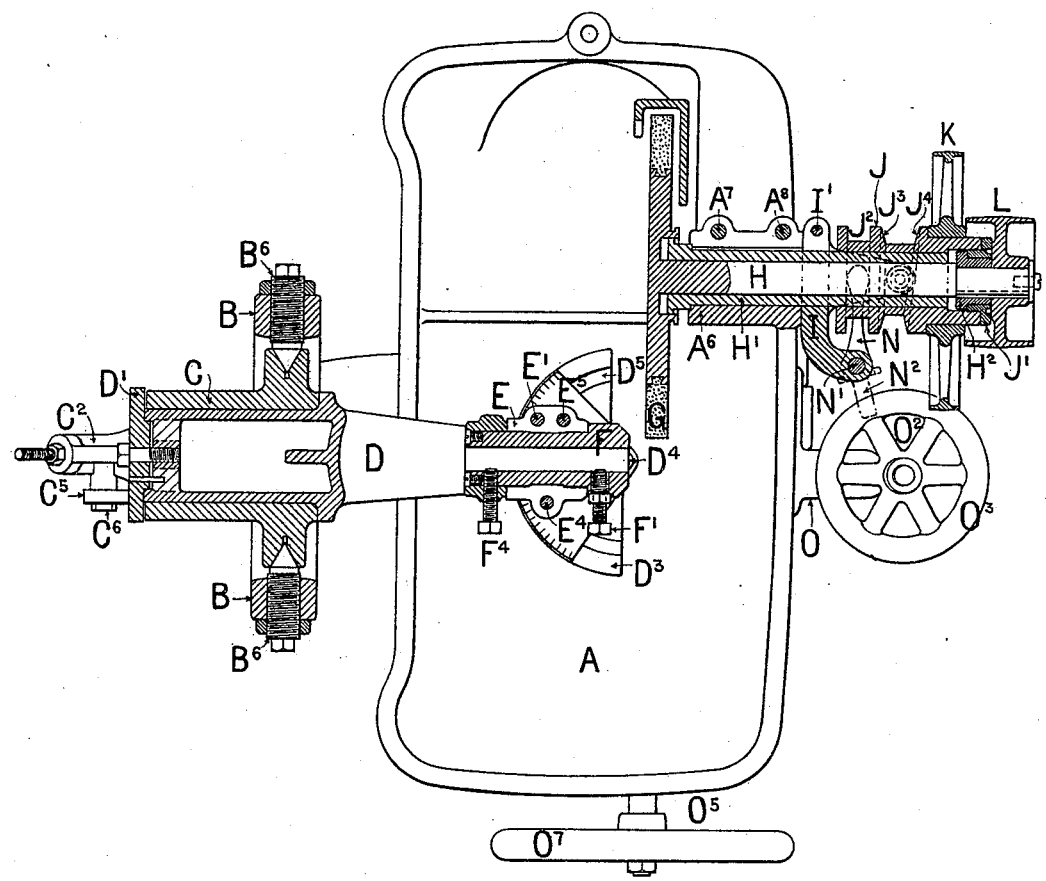

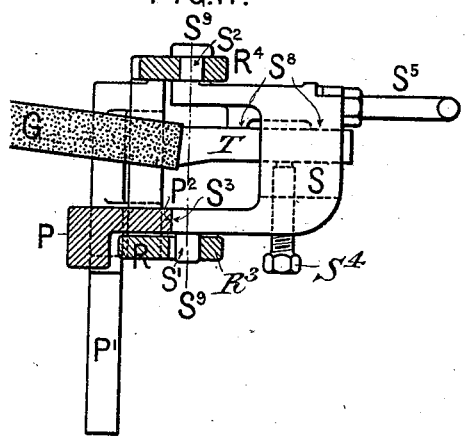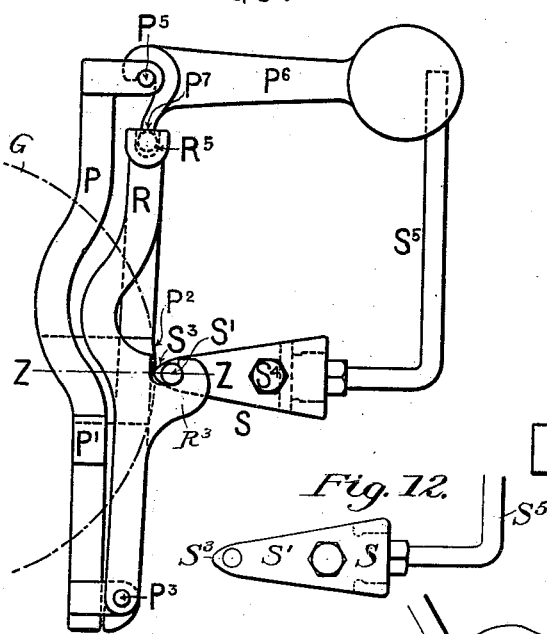

UNITED STATES PATENT OFFICE.

JOHN SELLERS BANCROFT AND WILLIAM H. THORNE, OF PHILADELPHIA, PENNSYLVANIA, ASSIGNORS TO THE WILLIAM SELLERS & COMPANY, INCORPORATED, OF SAME PLACE.

GRINDING-MACHINE.

SPECIFICATION forming part of Letters Patent No. 646,397, dated March 27, 1900.

Application filed October 23, 1896. Serial No. 609,858. (No model.)

*To all whom it may concern:*

Be it known that we, JOHN SELLERS BANCROFT and WILLIAM H. THORNE, of the city and county of Philadelphia and State of Pennsylvania, have invented certain new and useful Improvements in Grinding-Machines, of which the following is a specification.

Our invention relates to machines for grinding the plane and curved faces of cutting-tools, the intersections of which faces produce the cutting edges.

It is an object of our present invention to provide means for rapidly and economically forming, by grinding, the working faces of cutting-tools.

It is a further object of our invention to provide means whereby these faces can be readily and accurately located with reference to each other and to the shank of the tool; and to these ends our invention consists in providing a grinding-wheel having a cylindrical abrading-face with a reciprocating traverse in the line of its axis and with means for engaging and disengaging this traverse instantly at will; and it further consists in a tool-holder which carries a former and oscillates upon trunnions, a frame swinging on pivots at one end, weighted toward an abutment at the other end, with open bearings between these two ends, to receive the trunnions of the tool-holder, an abutment against which the former is pressed by the weighted frame, and means for moving the abutment toward and from the grinding-wheel; and it further consists in a rotatable tool-holding chuck that may be secured at any angle of rotation, in which chuck the support for the oscillating tool-holder or a straight-faced tool to be ground is clamped, a support for the chuck that may be rotated through a limited arc in a plane at right angles to the plane of rotation of the chuck and secured at any angle in this arc, and an arm carrying this support rotatable in a plane at right angles to the plane of rotation of the support with means for securing it at any angle; and it further consists in mounting this adjusting mechanism for the chuck so that this mechanism can be vibrated in a plane parallel to the axis of rotation of the grinding-wheel, whereby a face of a tool held in the chuck can be vibrated in a plane tangent to the abrading periphery of the grinding-wheel; and it further consists in providing for this mounting of the adjusting mechanism an axis parallel to the axis of vibration of the adjusting mechanism and preferably nearly in the plane of the grinding-wheel, so that by swinging the mounting about this axis a tool held in the chuck can be traversed across the face of the wheel and by adjustment axially the tool can be presented to or withdrawn from the abrading-surface of the wheel; and it further consists in means for locating the tool to be ground in the proper position in the oscillating chuck relatively to the former, so that tools of varying curvature can be ground from the same former.

Figure 15:
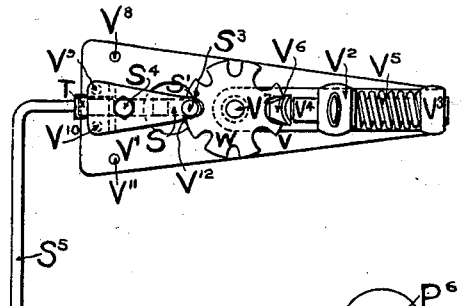
Figure 2:
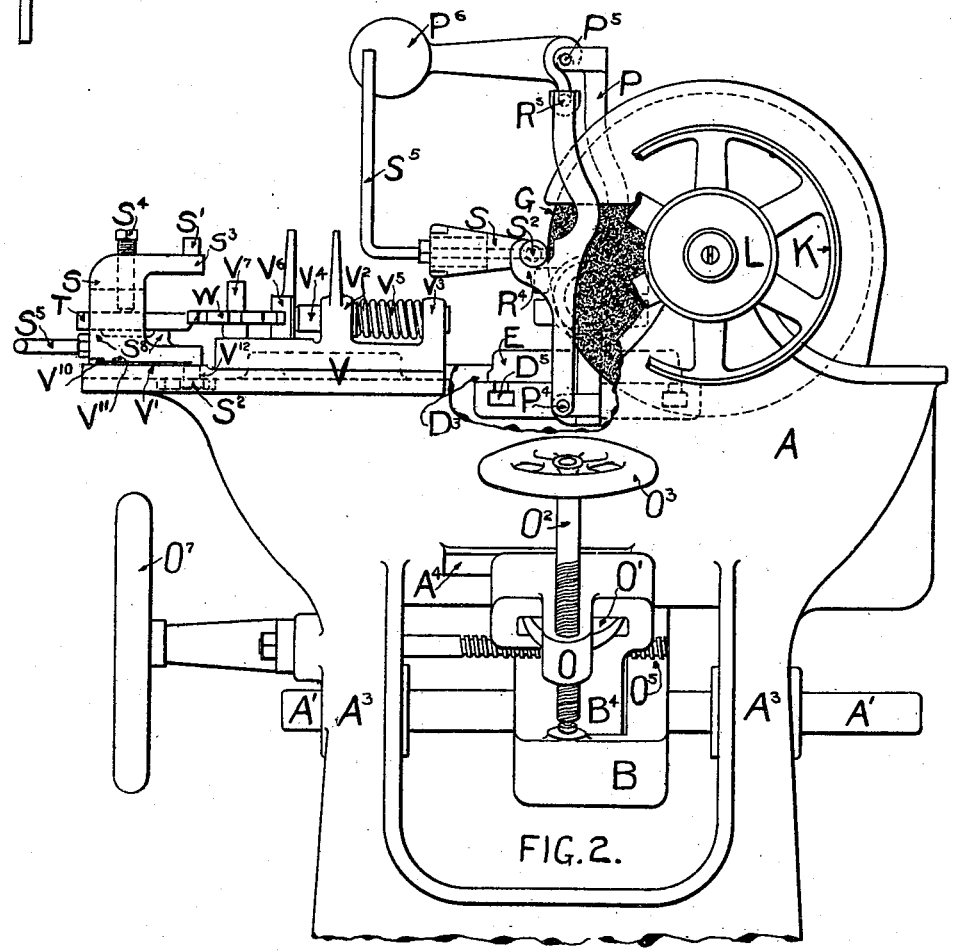
Figure 3:
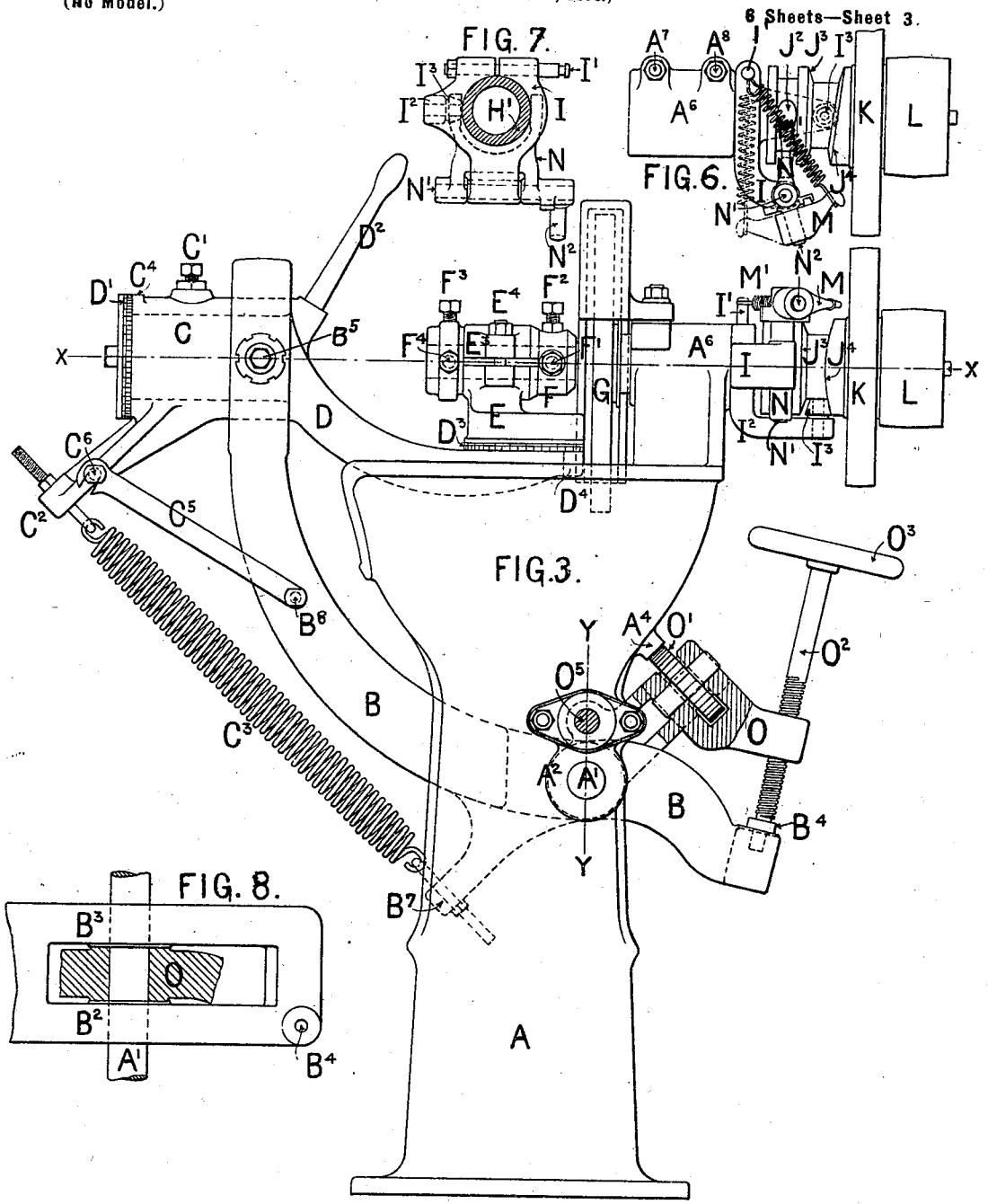
Figure 4:
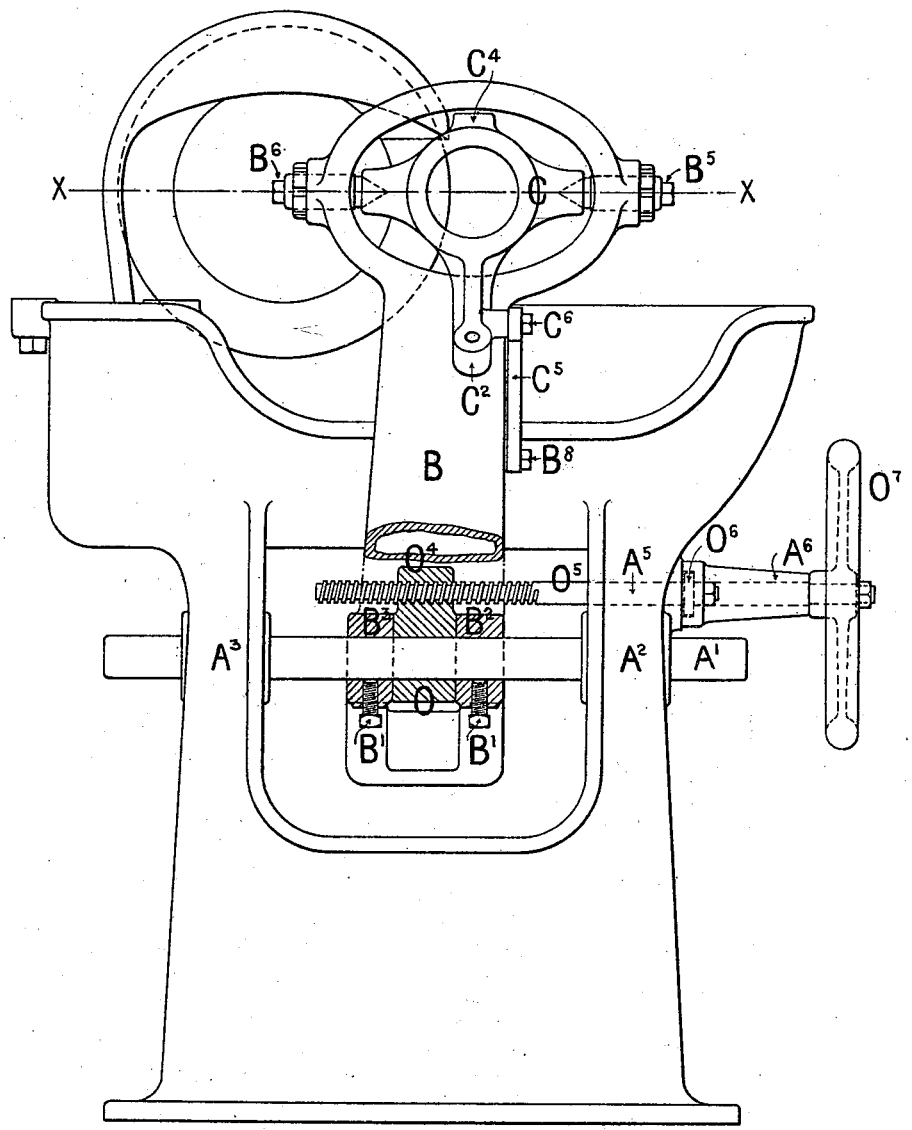

In the accompanying drawings, which form part of this specification, Figure 1, Sheet 1, represents a front view of a machine embodying our invention. Fig. 2, Sheet 2, is a side elevation of the same, showing the device for properly locating the tools to be ground. Fig. 3, Sheet 3, represents a front view, partly in section, with the oscillating chuck removed. Fig. 4, Sheet 4, is a side elevation of the same, partly in section, on the line Y Y of Fig. 3. Fig. 5, Sheet 5, is a plan, partly in section, on the line X X of Figs. 3 and 4. Fig. 6, Sheet 3, is a plan of the wheel-reciprocating mechanism of Fig. 3. Fig. 7 is a view of the stand and lever of the reciprocating mechanism. Fig. 8 is a plan of the lower end of the chuck-supporting frame. Fig. 9, Sheet 6, is an enlarged side elevation of the oscillating chuck and support for grinding curved-face tools, shown removed from the machine. Fig. 10 is a side elevation of Fig. 9. Fig. 11 is a plan of Figs. 9 and 10, partly in section, on the line Z Z. Fig. 12 shows the tool-holding chuck for curved-face tools. Figs. 13 and 14 show modifications of this chuck curved to the right and to the left for holding curved-face tools which are bent to the right and to the left. Fig. 15 is a plan of the device for properly locating the tools to be ground in the chuck for curved-face tools, shown in Fig. 2.

In all the figures similar letters refer to similar parts.

A represents the bed of a machine embodying our present invention.

B is the mounting to carry the chuck mechanism and is hinged to the bed A by the shaft A', which slides and turns freely in the bearings $A^2$ $A^3$ in the bed A, the mounting being firmly secured by the set-screws B' B' to the shaft A', which passes through it at $B^2$ $B^3$. (See Fig. 4.) The adjusting-arm O, Figs. 3, 4, and 8, has a hub bored to receive the shaft A', which hub fits between the bearings $B^2 B^3$. The arm O bears against a guiding-rib $A^4$ on the bed A and is preferably provided with a roller O' to diminish the friction. A screw $O^2$, operated by a hand-wheel $O^3$, passes through a threaded bearing in the arm O and bears against the step $B^4$ on the end of the mounting B, the center of gravity of the mounting, with the pieces carried by it, being considerably to the left of the shaft A' as looked at in Figs. 1 and 3. The step $B^4$ and the end of the screw $O^2$ are thus held together with considerable pressure, so that any rotation of the hand-wheel $O^3$ will, without any lost motion, rotate the mounting B about the axis of the shaft A'. To adjust the position of the tool to the grinding-wheel in a direction at right angles to this rotation, the arm O is also tapped or provided with a nut at $O^4$, Fig. 4, to receive the adjusting-screw $O^5$, journaled in the bed at $A^5$. The screw $O^5$ is provided with a collar $O^6$, which rests between the end of the bearing $A^5$ and the stand $A^6$. This screw has secured to it a hand-wheel $O^7$, by the rotation of which the arm O and mounting B may be moved toward or from the front of the machine, sliding the shaft A' through its bearings $A^2$ and $A^3$.

The upper end of the mounting B is made in the form of a yoke or hoop, in which are inserted the two centers $B^5$ and $B^6$, the common axis of these two centers being parallel with the axis of the shaft A' and parallel with the plane of rotation of the grinding-wheel G. Mounted upon these centers so as to swing freely is the bearing C, in which the arm D is journaled so as to turn freely. A set-screw C' serves to clamp the arm D securely to place after the proper angle of adjustment has been determined by the graduated disk D', secured to the end of the journal of the arm D, in connection with an index-mark at $C^4$. A projection $C^2$ from the lower side of the bearing C serves as a point of attachment for the spring $C^3$, the lower end of which is attached at $B^7$ to the mounting B for a purpose hereinafter described.

As shown in Fig. 1, for curved-face tools it is necessary to hold the arm D in rigid relation to the mounting B, and for this purpose we provide the latch $C^5$, pivoted at $B^8$ on the mounting B and by a notch in its upper end latching over the pin $C^6$, secured in the projection $C^2$. A handle $D^2$ facilitates the rotation and adjustment of the arm D when the set-screw C' is released. The arm D is curved down, as shown in Fig. 1, and its inner end is dressed to a flat surface $D^3$ of the general outline shown in Fig. 5 and parallel with the axis of rotation of the arm D (see Fig. 3) to receive the stand E, which is centered by the pin $D^4$ and secured to place by the bolt E', the head of which engages with the curved T-slot $D^5$. The outside of the base of the stand E is circular, with the pin $D^4$ as a center, and is provided with graduations whereby the stand E can be set to any desired angle of rotation within the limits of the T-slot $D^5$. It will be observed that the axis of rotation of the stand E is at right angles to that of the arm D. Journaled in the stand E is the chuck F, provided with a rectangular opening through it, parallel with its axis of rotation, and the four set-screws F' $F^2$ $F^3$ $F^4$, by which the shank P' of the support for the oscillating frame is secured in this opening. The bearing for chuck F is provided with a cap $E^3$, secured to place by the bolts $E^4$ $E^5$, the latter of which holds the cap $E^3$ firmly to the bearing, while the front of the cap does not touch the bearing, as shown by the double line in Fig. 3, and when the bolt $E^4$ is tightened the chuck F is clamped firmly to place. By slacking the bolt $E^4$ the chuck F may be rotated to any desired position required and clamped there by this bolt $E^4$.

P, Fig. 9, is a support for an oscillating tool-holder for grinding curved faces on cutting-tools. It is provided with a rectangular shank P', by which it is secured in the chuck F. The upper end of the support is provided with a pin $P^5$, by which the counterweight-lever $P^6$ is carried. The lower end is provided with two pins $P^3$ $P^4$, on which the oscillating frame R is hinged by the bearings R' $R^2$. The frame R is approximately rectangular, as shown in Fig. 10, and at its upper end has a recess $R^5$, which receives the short arm $P^7$ of the counterweight-lever $P^6$. About half the way up the frame R two hook-bearings $R^3$ $R^4$ are provided, which receive the trunnions S' $S^2$ of the oscillating tool-holder S, which is provided with a seat $S^3$, against which a tool T to be ground may be secured by a set-screw $S^4$. The arm of the tool-holder S, which carries the trunnion S', is formed to a shape or former corresponding to the shape desired on a given-sized tool, as indicated at $S^3$. When the oscillating tool-holder S is laid in its bearings in the frame R, as shown in Figs. 1, 2, 9, and 11, this former rests against the guiding-face $P^2$ on the support P, which face $P^2$ is a section of a cylinder corresponding to the average diameter of the grinding-wheel G. The former $S^3$ and this guide $P^2$ are held in contact by the effect of the counterweight $P^6$, and as the oscillating holder S is oscillated about its trunnions S' $S^2$ by means of its handle $S^5$ the frame R vibrates on its bearings as the distance from the center of the trunnions to the face of the former $S^3$ varies, and a tool T, held in the chuck and presented to the grinding-wheel G, would be ground by the oscillation of the holders to a contour parallel with the contour of the former $S^3$. If the tool projects beyond the former, the resultant shape would be parallel to that of the former, but much larger, so that the end of the tool would have a curve of much larger radius than the former. As the tool is moved farther back in the holder or as the metal of the tool is ground away the end of the tool will become of smaller and smaller radius until the ground surface is of so much smaller radius than that of the former that the point of the tool becomes sharp. We are therefore enabled with one former by changing the position of the tool relatively to the axis of oscillation to produce tools of widely-varying curvature. In Fig. 11 the axis $S^9 S^9$ of the oscillating tool-holder S is shown at an angle with the abrading-face of the grinding-wheel G by the adjustment of the stand E, and as the holder swings on this axis the surface produced on the end of the tool will be conical, the angle of the wheel with the axis giving the necessary clearance for free cutting.

The tool-holder S is shown as adapted for straight tools. If it is desired to grind bent ones, holders are made to the desired angle, either right or left hand, as indicated by Figs. 13 and 14. To take out a tool that has been ground, the counterweight $P^6$ is raised, so as to relieve the pressure of the former $S^3$ against the abutment $P^2$, and the tool-holder S is lifted out of its bearings $R^3 R^4$, the set-screw $S^4$ released, and the tool removed, when another tool can be put in the chuck or another chuck, with a tool clamped in it, may be put in the machine, and by this act alone the tool is secured in position to be ground.

In order to locate a tool to be ground in the proper position in the tool-holder S, we provide the plate V, Figs. 1 and 2, formed with or secured to the bed A in a convenient position for the operator. The top of this plate is a plane surface V' to receive the tool-holder S, a notch $V^{12}$ being made to receive the neck of the trunnion $S^2$ and pins $V^8$ $V^9$ $V^{10}$ $V^{11}$, located to secure the tool-holder S in the proper position on the plane V', the pins $V^9$ $V^{10}$ securing the holder for straight tools, as shown, the pins $V^8$ $V^{11}$ serving for right or left hand tools, respectively. Mounted on the stud $V^7$, secured in the stand V, is the revoluble gage W, which is provided on its periphery with notches of various sizes and depths, corresponding to the various sizes of tools required to be ground. A plunger $V^4$, sliding in bearings $V^2$ and $V^3$ and pressed forward by a spiral spring $V^5$, is provided on its front end with a V-shaped end $V^6$, which enters into any of the notches in the periphery of the gage W, and so holds an opposite notch in the correct position relatively to the trunnions of the tool-holder S. A tool T to be ground is then pushed forward in the holder until it rests in this notch, when it is secured in position by the set-screw $S^4$. This gaging apparatus enables the rough tool to be placed rapidly and accurately in the proper position in the holder so as to insure the removal of the minimum quantity of metal to produce the finished contours. By providing several of these tool-holders S a boy can set the tools to place in the holders while the operator is grinding, and so greatly increase the product of the machine.

G is the grinding-wheel, with a cylindrical abrading-surface. It is secured on the end of the shaft H, which turns and slides freely in the sleeve H', which is secured in the bearing $A^6$, formed in the upper part of the bed A. The bearing $A^6$ is preferably split on one side, so that by tightening the bolts $A^7$ $A^8$ the sleeve H' may be firmly secured to the bed A in the desired position. To the outer end of shaft H is secured the driving-pulley L. The sleeve H' projects beyond the bearing $A^6$, as shown in Fig. 5, and carries the revoluble piece J, which turns and slides freely upon it. The outer end of the piece J is connected to the pulley L and shaft H by the flanged bushing $H^2$, keyed to the shaft H, and the flanged nut J' firmly secured in the piece J, so as to permit the free revolution of the piece J relatively to the pulley and shaft, but so as to compel them to move together in sliding in the line of their common axis. The traverse-pulley K is driven by a belt, is secured to the revoluble piece J, and serves to drive it at a number of revolutions preferably prime to the number of revolutions of the pulley L. An abutment-stand I is bored to fit on the sleeve H', to which it is clamped by the bolt I'. Pivoted to the stand I by the pin N' is a forked lever N. The ends of the prong of the fork lie in the groove $J^2$ in the piece J. The lever N is also provided with a stud $N^2$, which carries the reversible arm M, the end of which is connected to the upper end of the bolt I' by the spiral spring M', the pressure of which tends to rotate the lever N about its pivot N' counter-clockwise in the position shown in Fig. 6. By swinging the arm M about its stud $N^2$ through one hundred and eighty degrees until it is again horizontal the action of the arm M on the lever N is reversed and it will, under the pressure of the spring, tend to rotate the lever N clockwise, and the prongs of the forked lever N will press against a side of the groove $J^2$ in the piece J and tend to slide it on the sleeve H' toward or from the bearing $A^6$, according as the arm M is in the position shown in Figs. 1, 3, and 6 or in the position indicated by broken lines in Fig. 6. An arm $I^2$ is provided on the lower part of the stand I, which carries an abutment $I^3$, preferably made in the form of a roller, which engages with the true guiding-surface $J^3$, formed on the piece J, when the reversible arm M is in the position indicated by the broken lines in Fig. 6. This true guiding-surface $J^3$ is then held firmly in contact with the abutment $I^3$, and all longitudinal movement of the grinding-wheel arbor is prevented. The cam-guiding surface $J^4$ on the piece J is inclined to the axis of the piece J, as shown in Figs. 1, 3, 5, and 6, and may be made of any desired contour. When the reversible arm M is in the position shown in Fig. 6, the action of the spring M' holds this cam-surface $J^4$ firmly in contact with the abutment $I^3$, and as the piece J is revolved by the pulley K the spring and cam together impart a reciprocating movement to the piece J and thence to the grinding-wheel G, the amount of this movement being measured by the angle of inclination of the cam $J^4$. Thus by reversing the position of the reversible arm M the grinding-wheel G may be held stationary for grinding up to a shoulder or may be reciprocated at will for the purpose of maintaining the cylindrical abrading-surface true and free from grooves or ridges.

Thus far the machine has been described for grinding the curved faces of tools only. To grind the straight faces of tools the intersection of which with the curved faces forms the cutting edges, it is necessary to remove the oscillating tool-holder and its support by releasing the set-screws F', $F^2$, $F^3$, and $F^4$, which have pinched the shank P in the chuck F. The tool to be ground is then placed in the chuck F with its end projecting a suitable distance toward the wheel and is clamped therein by as many of these set-screws as may be necessary. The latch $C^5$ is unhooked from the pin $C^6$, as shown in Fig. 3, and the tension of the spring $C^3$ adjusted so as to counterbalance the chuck F with the tool, holding the latter about the height of the abrading-point of the wheel. This adjustment when once made need not be disturbed, as the latch $C^5$ holds the arm D rigidly to place when the oscillating chuck is in place.

The operation, then, of grinding the straight face of a tool is as follows: If, for example, it is the end of a square-nosed tool that is to be ground, the bolt E' is released and the stand E rotated on its pivot $D^4$ until the end face of the tool is parallel to the face of the grinding-wheel, when the bolt E' is tightened. The arm D is then rotated in its bearing to give the proper angle of clearance, as ascertained by the graduated disk D' and index $C^4$, when it is secured to place by the set-screw C'. The hand-wheel $O^3$ is then adjusted to bring the tool opposite to the grinding-wheel and the reversible lever M put in the position shown in the drawings to produce the reciprocating movement of the wheel G. The hand-wheel $O^7$ is then turned to bring the tool gently into contact with the wheel, the latch $C^5$ being released and the tool-chuck vibrated on its centers $B^5$ and $B^6$ up and down past the abrading-face of the grinding-wheel, the vibration of the arm D and the reciprocating movement of the wheel thus traversing all points of the tool-face over the wheel and resulting in the rapid formation of a true plane surface. To grind the top of the tool to form the cutting edge, it is most convenient to rotate the chuck F in its bearing through ninety degrees and then to make the adjustments for angle and clearance, as above described. While the arm D, carrying the chuck, can be rotated for adjustment through a complete revolution, it is rarely necessary to move it more than a few degrees from the position shown.

Having now described our invention, what we claim as new, and desire to secure by Letters Patent, is—

1. In a grinding-machine, a grinding-wheel movable axially, a fixed abutment, a revoluble piece provided with a guiding-surface thereon which revolves truly about the axis of the piece, another guiding-surface thereon which is a cam, and a lever engaging with the revoluble piece, in combination with a spring-pressed arm on the lever reversible about the fulcrum of the lever.

2. In a grinding-machine, a tool-holder which oscillates upon trunnions between which the grinding-wheel operates, a former secured upon a trunnion contactual with an adjustable abutment, and a frame swinging on pivots at one end and weighted at the other end against an abutment, with open bearings between the two ends to receive the trunnions of the tool-holder.

3. In a grinding-machine, a grinding-wheel, a tool-holding chuck adjustable about an axis substantially in line with the shank of the tool to be ground, a stand holding this chuck, adjustable about an axis perpendicular to the axis of the chuck, and an arm supporting this stand, adjustable about an axis at right angles to that of the stand.

4. In a grinding-machine, a grinding-wheel, a tool-holding chuck adjustable about an axis substantially in line with the shank of the tool to be ground, a stand holding this chuck, adjustable about an axis perpendicular to the axis of the chuck, and an arm supporting this stand adjustable about an axis at right angles to that of the stand, in combination with a supporting-mounting to which the chuck mechanism is hinged on an axis parallel to the plane of rotation of the grinding-wheel.

5. In a grinding-machine, a grinding-wheel, a tool-holding chuck adjustable about an axis substantially in line with the shank of the tool to be ground, a stand holding this chuck, adjustable about an axis perpendicular to the axis of the chuck, and an arm supporting this stand adjustable about an axis at right angles to that of the stand, a supporting-mounting in which the chuck mechanism is hinged on an axis parallel to the plane of rotation of the grinding-wheel in combination with a bed to which the mounting is hinged on an axis parallel to the chuck-mechanism axis, and preferably nearly in the plane of rotation of the grinding-wheel.

6. In a grinding-machine, a grinding-wheel, a tool-holding chuck adjustable about an axis substantially in line with the shank of the tool to be ground, a stand holding this chuck, adjustable about an axis perpendicular to the axis of the chuck, and an arm supporting this stand adjustable about an axis at right angles to that of the stand, a supporting-mounting in which the chuck mechanism is hinged, a bed to which this mounting is hinged, and means for moving the mounting axially in the hinge which connects the mounting to the bed.

7. In a grinding-machine a tool-holder which oscillates upon trunnions between which the grinding-wheel operates, and means for finding the proper position of the tool in the tool-holder, before it is secured therein.

J. SELLERS BANCROFT.
WM. H. THORNE.

Witnesses:
JOHN L. PHILLIPS,
E. R. HARPER.